Feb. 5, 1929.  
J. T. PEARSON ET AL  
1,701,117
CANOPY CONDUIT OUTLET BOX
Filed Jan. 26, 1926
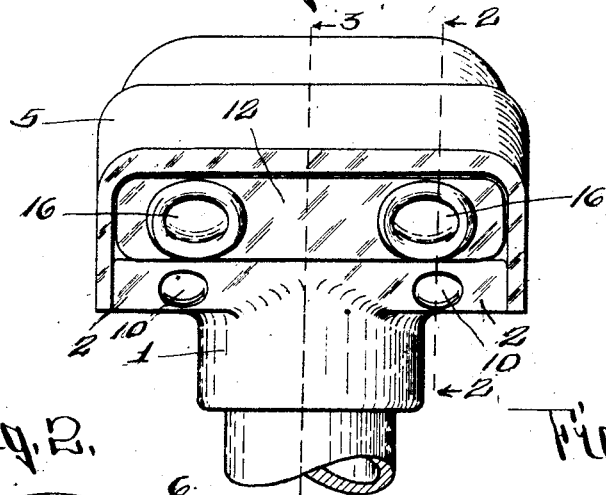
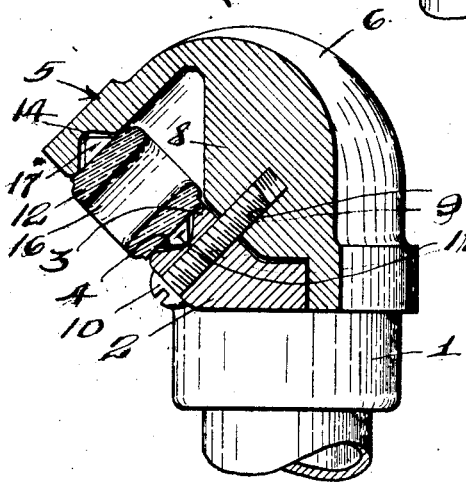
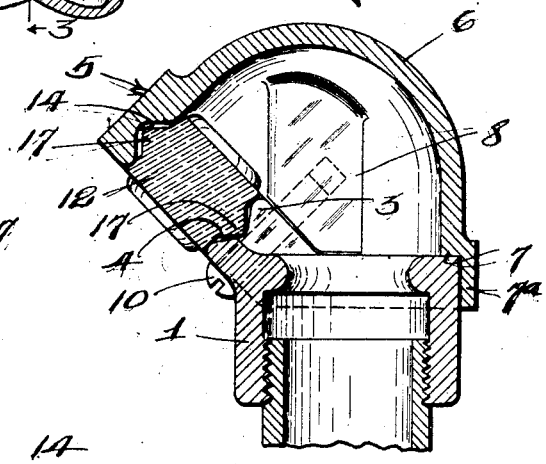
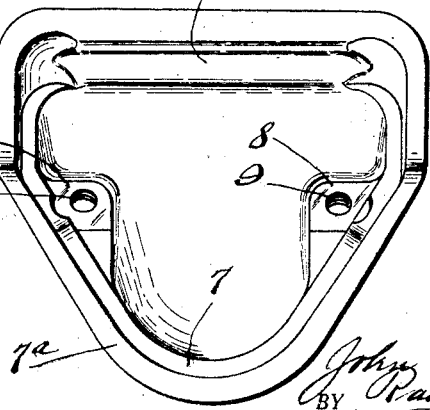
INVENTORS,
John T. Pearson and
BY Raymond H. Alley.
Parsons & Bodell
ATTORNEYS.

Patented Feb. 5, 1929.

1,701,117

UNITED STATES PATENT OFFICE.

JOHN T. PEARSON AND RAYMOND H. OLLEY, OF SYRACUSE, NEW YORK, ASSIGNORS TO CROUSE-HINDS COMPANY, OF SYRACUSE, NEW YORK, A CORPORATION OF NEW YORK.

CANOPY CONDUIT-OUTLET BOX.

Application filed January 26, 1926. Serial No. 83,819.

The principal object of the invention is to provide a canopy top for the permanent ends of upright conduits which will be very easily removed and replaced so as to give ready access to the wires.

The principal feature of the invention consists in the novel construction and arrangement of parts, whereby a canopy member is supported by a flanged member arranged at the end of a conduit and an insulator block is locked between the flange and canopy members.

In the drawings, Figure 1 is a front elevational view of the improved canopy top.

Figure 2 is a vertical section through the line 2—2 of Figure 1.

Figure 3 is a vertical section through the line 3—3 of Figure 1.

Figure 4 is an underside plan of the canopy top.

This conduit outlet box comprises, generally, a pipe end member in the form of a collar threaded to receive the end of the pipe, the collar having an end bearing face around the passage thereof and a canopy member having a surface abutting against the end bearing face of the pipe end member or collar, and an overhanging portion provided with a surface opposed to a surface of the collar and confining the outlet opening of the box, and a closure or insulator for such opening, such closure being located between opposing surfaces of the overhanging portion of the canopy member and of the collar and means for clamping the collar and the canopy together and thereby clamping the insulator in position, the clamping means being located at one side of the outlet opening of the box.

As here illustrated, the pipe end member or collar is formed with a flaring flange portion at one side terminating in a straight edge, which flange constitutes one side wall of the outlet opening of the box and the overhanging portion of the canopy is formed with a flanged opposed to the former flange and terminating in a straight edge and constituting the opposite side of the outlet opening of the box.

Preferably, the insulator and the walls of the box are formed with interlocking tongues and grooves. Also the pipe end member or collar is provided with a pair of lugs on the flaring flange portion thereof, these lugs being located on opposite sides of the passage of the pipe end member. The canopy member is formed with opposing lugs and the fastening members are screws extending through such flaring flange and lugs of the pipe end member and thread into the lugs of the canopy. These lugs on the pipe end member also coact with the insulator or closure.

Referring to the drawings, the pipe end member 1 is threaded to be secured to the end of an upright conduit and is formed with an upper end bearing surface or platform and also with a flaring flange 2 offset at one side thereof which flange terminates in a straight edge. The flaring flange 2 is provided with the lugs 3 on opposite sides of the opening or passage of the pipe end member, these lugs together with the top surface of the flange 2 form a bearing surface for the closure or insulator to be described. This surface being in the form of a V shaped notch 4.

5 designates the canopy member having a rounding or hooded back portion 6 provided with a surface or shoulder 7 abutting against the upper end bearing surface of the pipe end member 1 and also having a depending flange 7ª skirting the end of the pipe member 1, this flange being located on the side of the canopy opposite the overhanging portion thereof.

The canopy 5 has an overhanging portion or flange opposed to the flange 2 and terminating in a straight edge, this overhanging portion of the canopy together with the flange 2 confining the outlet opening of the box in which opening is located, a closure or insulator.

The canopy 5 is formed on its inner face with bosses or lugs 8 opposed to the lugs 3, these bosses or lugs 8 being formed with threaded holes 9 for receiving clamping screws 10 extending through holes 11 in the flange 2 and the lugs 3 thereon. The screws 10 extend obliquely upwardly and inwardly relatively to the axial line of the pipe end member.

12 designates the closure which is usually formed of an insulating material as porcelain, this closure or insulator being located between the inner surface 13 of the overhanging portion of the canopy 5 and the flange 2 with its lugs 3. The insulator or closure 12 and the surfaces of the pipe end member or collar and the canopy with which it coacts are preferably formed with interlocking tongues and grooves, the canopy being formed with grooves 14 for receiving a tongue 17 on the closure and the closure also being formed with a tongue 17 on its opposite side coacting with the notches 4 formed by the flange 2 and its lugs 3. The closure is also formed with one or more passages 16 therethrough for the wires. The cover or canopy is thus formed with a rectangular front portion extending beyond the bosses or lugs 8 in an oblique direction. The shoulder 7 is continued beyond the bosses 8 and forms a seating surface for the porcelain closure 12.

It is apparent that the canopy is readily placed in position or removed. It is simply placed over the pipe end member 1 so that the shoulder 7 rests on the upper abutting end surface of the pipe end member. The porcelain closure is threaded onto the wires leading out from the box and located between the canopy and the flaring flange 2 of the pipe end member and then the screws 10 placed in position and tightened thus clamping together the abutting end faces of the canopy and the pipe end member, the skirting flange of the canopy against the pipe end member and also clamping the closure between said members.

Owing to the arrangement of the abutting end surfaces of the canopy and pipe end member the skirting flange and to the interlocking of the porcelain closure with the canopy and the pipe end member, water can not work into the interior of the outer box as all of such surfaces are arranged in such direction as to lead off any water away from the interior.

What we claim is:

A conduit outlet box comprising a pipe end member in the form of a collar having a flat end bearing face around the passage thereof beyond the end of the pipe, and an outwardly flaring flange terminating in a substantially straight edge at one side of said passage, a canopy having an end surface abutting against the bearing surface of the collar, and a flange skirting the outer peripheral side of the collar and the end edges of said flange, the canopy also having an overhanging portion terminating in a flange having a straight edge opposed to and spaced apart from the former straight edge, the flange being provided with lugs on the inner side thereof and located at opposite sides of the passage of the collar, and the canopy having internal bosses at opposite sides of said passages and opposed to said lugs, the flange being formed with screw holes extending therethrough and through the lugs and the bosses being formed with alined screw holes and screws extending from the front side of the flange into the screw holes for holding the canopy on the collar, the flange of the canopy and the flange of the collar confining the outlet opening of the box, and an insulator for closing said opening.

In testimony whereof, we have hereunto signed our names, at Syracuse, in the county of Onondaga and State of New York, this 31st day of December, 1925.

JOHN T. PEARSON.
RAYMOND H. OLLEY.